US008572940B2

(12) United States Patent
Schmidt et al.

(10) Patent No.: US 8,572,940 B2
(45) Date of Patent: Nov. 5, 2013

(54) MOWER WITH THUMB WHEEL THROTTLE CONTROL

(75) Inventors: Gordon R. Schmidt, Farmington, MN (US); Helmut J. Ullrich, Eden Prairie, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 13/369,379

(22) Filed: Feb. 9, 2012

(65) Prior Publication Data

US 2013/0205735 A1 Aug. 15, 2013

(51) Int. Cl.
*A01D 69/06* (2006.01)

(52) U.S. Cl.
USPC .......................................................... 56/11.1

(58) Field of Classification Search
USPC ................... 56/11.1, 10.8, DIG. 18; D34/35; 180/332, 19.3; 338/184, 164, 174, 838; 74/489, 104, 502.2, 480 R, 501.6
See application file for complete search history.

(56) References Cited

U.S. PATENT DOCUMENTS

| 3,172,070 | A | * | 3/1965 | Hardison et al. ............. 338/163 |
| 3,355,693 | A | * | 11/1967 | Van Benthuysen et al. .. 338/184 |
| 3,393,578 | A | | 7/1968 | Tschanz |
| 3,732,748 | A | | 5/1973 | Cavalli |
| 4,232,565 | A | * | 11/1980 | Leonheart ....................... 74/489 |
| 4,335,566 | A | | 6/1982 | Hurd |
| 4,737,125 | A | | 4/1988 | Irwin |
| 4,813,214 | A | * | 3/1989 | Barnard et al. ................ 56/11.3 |
| 4,930,369 | A | * | 6/1990 | Barnard et al. ............. 74/480 R |
| 4,936,160 | A | * | 6/1990 | Barnard et al. ............. 74/501.6 |
| 5,007,301 | A | * | 4/1991 | Powell ............................ 74/557 |
| 5,119,632 | A | * | 6/1992 | Nishimura et al. ............. 60/487 |
| D364,029 | S | * | 11/1995 | Noonan et al. ................. D34/35 |
| 5,561,734 | A | * | 10/1996 | Simonsen et al. ............ 388/838 |
| 6,047,614 | A | * | 4/2000 | Beugelsdyk et al. ........ 74/502.2 |
| D445,552 | S | * | 7/2001 | Pulskamp et al. ............. D34/35 |
| 6,557,331 | B2 | * | 5/2003 | Busboom et al. ............. 56/10.8 |
| 6,668,529 | B2 | * | 12/2003 | Busboom et al. ............. 56/10.8 |
| 6,796,392 | B2 | * | 9/2004 | Kobayashi et al. .......... 180/19.3 |
| D497,463 | S | * | 10/2004 | Swetish ......................... D34/35 |
| 7,299,115 | B2 | * | 11/2007 | Honda ............................ 701/22 |
| 7,318,309 | B2 | * | 1/2008 | Osborne ........................ 56/10.8 |
| 7,383,915 | B2 | * | 6/2008 | David et al. ................... 180/332 |
| 2003/0192295 | A1 | * | 10/2003 | Busboom et al. ............. 56/16.7 |
| 2005/0252185 | A1 | * | 11/2005 | Osborne ........................ 56/10.8 |
| 2012/0234573 | A1 | * | 9/2012 | Suda et al. .................... 173/217 |

* cited by examiner

*Primary Examiner* — Árpád Fábián-Kovács (74) *Attorney, Agent, or Firm* — James W. Miller (57) ABSTRACT

A mower for cutting grass comprises a traction frame that is self-propelled over the ground by a power source carried on the traction frame. The mower includes a thumb wheel throttle control that progressively increases and decreases the power output of the power source as the thumb wheel is rotated in one direction or an opposite direction. The thumb wheel has a plurality of tabs that define grooves on an arcuate rim on the thumb wheel for receiving a thumb or index finger of one of the operator's hands.

7 Claims, 8 Drawing Sheets

MOWER WITH THUMB WHEEL THROTTLE CONTROL

TECHNICAL FIELD

This invention relates to mowers for cutting grass and, more particularly, to a throttle control used on a mower for varying the power output of a power source carried on the mower.

BACKGROUND OF THE INVENTION

Walk reel mowers are known for the precision cutting of grass to very low heights of cut. Such mowers are most commonly used for cutting the grass on the greens of golf courses and thus are typically referred to as greensmowers. The mower includes a reel cutting unit having a rotatable reel that sweeps the grass against a sharpened bedknife for cutting the grass between the blades of the reel and the bedknife. The mower is self-propelled by a power source carried on the mower which is operatively connected to a rotatable, ground engaging traction drum carried on the mower.

The walk reel mower described above includes a generally U-shaped handle assembly that extends upwardly and rearwardly therefrom to allow an operator who walks on the ground behind the mower to guide and manipulate the mower. The top of the handle assembly includes a transverse cross member that forms a hand grip which the operator grips with his or her hands to hold onto the handle assembly. A control panel is located adjacent the cross member extending across the width of the handle assembly by spanning the distance between the laterally spaced left and right handle tubes that are part of the handle assembly. The control panel is used to mount various controls that are manipulated by the operator during operation of the walk reel mower.

One such control mounted on the control panel is a pivotal throttle lever for varying the power output of the power source carried on the mower. Since that power source is often an internal combustion engine, the throttle lever is typically linked by a Bowden cable to a pivotal throttle on the engine. The throttle lever pivots about a laterally extending horizontal axis on the control panel to move in a longitudinal fore-and-aft plane. When the operator pushes the throttle lever forwardly, the Bowden cable moves in a first direction to advance the throttle control on the engine to increase the speed of the engine. Conversely, when the operator pushes the throttle lever rearwardly, the Bowden cable moves in a second opposite direction to retard the throttle control on the engine to decrease the speed of the engine.

To be easily accessible to the operator, the throttle lever usually sticks up a few inches above the control panel and has a knob on its upper end to facilitate gripping by the operator. However, there are many other controls carried on the control panel as well. These controls include controls for engaging the traction drum to cause movement of the mower over the ground and for engaging operation of the rotatable reel to begin mowing. In addition, various pivotal operator presence control type bails may be used that need to be squeezed shut against the hand grip to maintain the operation of the traction drum and the reel. If the operator releases these bails such that the bails pivot away from the hand grip, the operation of the traction drum and the reel will be automatically halted as a safety measure.

Accordingly, fitting a pivotal throttle lever onto the control panel is often a challenge for the mower designer. Moreover, being able to grip and pivot the throttle lever to advance or retard the engine speed typically requires the user to remove one hand from the hand grip of the handle assembly. This at least temporarily decreases the hold the operator has on the handle assembly thereby potentially impairing the steering control the operator is able to exert on the mower using the handle assembly. Accordingly, an improved throttle control that would be more compact and out of the way on the control panel and that could be moved by the operator without having to release any part of the operator's grip on the handle assembly would be an improvement in the mower art.

SUMMARY OF THE INVENTION

One aspect of this invention relates to a mower for cutting grass. The mower comprises a traction frame supported for movement over the ground. A power source is carried on the traction frame with the power source having a variable power output. A grass cutting unit is carried on the traction frame. A hand operated rotary wheel is also operatively carried on the traction frame for rotation about an axis in first and second opposite directions. Rotation of the wheel operatively increases and decreases the power output of the power source as the wheel is rotated in the first and second directions, respectively.

BRIEF DESCRIPTION OF THE DRAWINGS

This invention will be described in the following Detailed Description when taken in conjunction with the drawings in which like reference numerals refer to like elements throughout.

DETAILED DESCRIPTION

Figure 1:
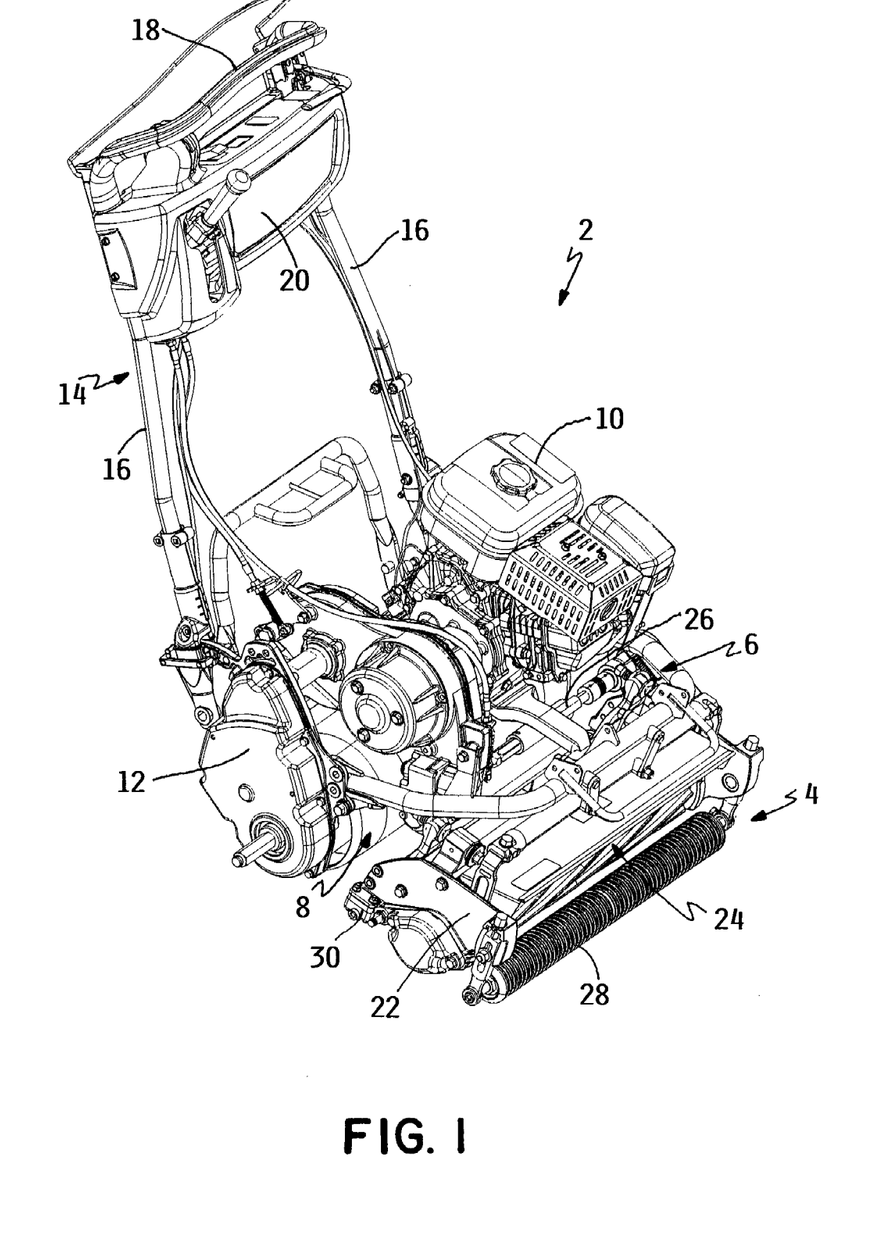
FIG. 1 is a perspective view of a first embodiment of a mower according to this invention.

A mower according to this invention is generally illustrated as 2 in FIG. 1. Mower 2 preferably comprises a walk greensmower having a reel cutting unit 4 for precision mowing of grass at low heights of cut on golf course greens or the like. However, mower 2 is not limited to being a greensmower or even a reel mower but may comprise mowers of other types.

For example, mower 2 could comprise a rotary mower having one or more grass cutting blades that rotate about vertical axes in horizontal cutting planes.

Figure 2:
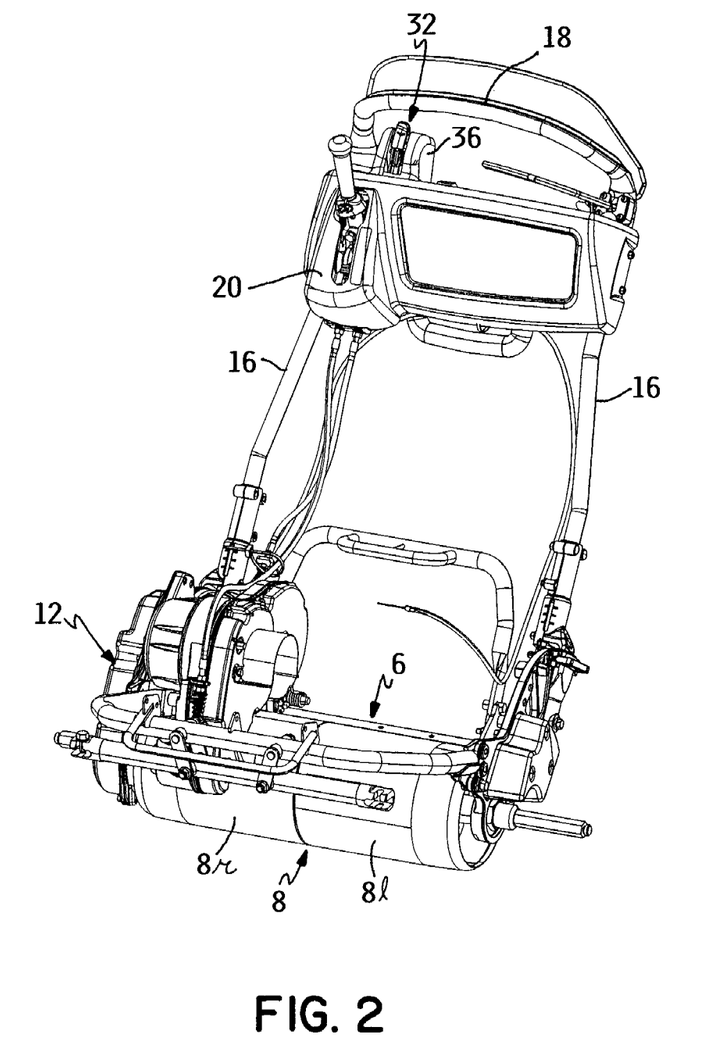
FIG. 2 is a perspective view of the mower of FIG. 1, particularly illustrating the mower with the reel cutting unit and the internal combustion engine having been removed for the sake of clarity.

Referring to both FIGS. 1 and 2, mower 2 comprises a traction frame 6 that is supported by a ground engaging traction drum 8 which is split into separate left and right drum halves 8l and 8r. Traction frame 6 mounts a power source comprising an internal combustion engine 10. Engine 10 is operatively coupled to traction drum 8 through a traction drive system 12 for rotating traction drum 8 when engine 10 is operating to self-propel mower 2 over the ground. Traction drive system 12 includes a differential (not shown) that is built into traction drum 8 for allowing the left and right drum halves 8l and 8r to rotate at different speeds during turns of mower 2.

A generally U-shaped upwardly and rearwardly extending handle assembly 14 is provided at the rear of traction frame 6 to allow an operator who walks on the ground behind traction frame 6 to guide and manipulate mower 2 during operation of mower 2. Handle assembly 14 includes laterally spaced left and right handle tubes 16 that are attached at their lower ends to opposite sides of traction frame 6. Handle tubes 16 are joined together at their upper ends by a laterally extending hand grip 18 which the operator can hold onto when operating mower 2. A control panel 20 extends between the upper ends of handle tubes 16 and is located slightly below hand grip 18.

Traction frame 6 mounts cutting unit 4 thereon in advance of engine 10 and in advance of traction drum 8. Cutting unit 4 comprises a cutting unit frame 22 that carries a helically bladed reel 24 that is journalled between spaced side plates of cutting unit frame 22 for rotation about a substantially horizontal axis. A bedknife is fixed to cutting unit frame 22 below and closely adjacent to the outer diameter of reel 24 so that grass is cut by a shearing action when the blades of reel 24 sweep uncut stalks of grass against a sharpened front edge of the bedknife. A cutting reel drive system 26 operatively powers reel 24 from engine 10. Cutting unit frame 22 is supported by its own front and rear ground engaging rollers 28 and 30, respectively.

Cutting unit 4 at the front of mower 2 is pivotally coupled to traction frame 6 by a suspension system that allows cutting unit 4 to conform to ground contours independently of traction frame 6. More particularly, the suspension system provides cutting unit 4 with the ability to pitch fore-and-aft about a substantially horizontal, laterally extending pitch axis and to roll side-to-side about a substantially horizontal, longitudinally extending roll axis. U.S. Pat. No. 7,191,584, which is assigned to The Toro Company, the assignee of this invention, and which is hereby incorporated by reference, discloses a suspension system that can be used on mower 2 for providing pitch and roll to cutting unit 4.

This invention relates particularly to an improved throttle control 32 on mower 2. Throttle control 32 comprises a thumb wheel 34. Referring again to FIGS. 2 and 3, thumb wheel 34 is mounted in an upwardly extending housing 36 located at the top of control panel 20 and is positioned on the right hand side of control panel 20 because most operators are right handed. When so located, thumb wheel 34 will underlie hand grip 18 of handle assembly 14 to allow the operator to reach and rotate thumb wheel 34 without removing the operator's hands from hand grip 18.

Figure 5:
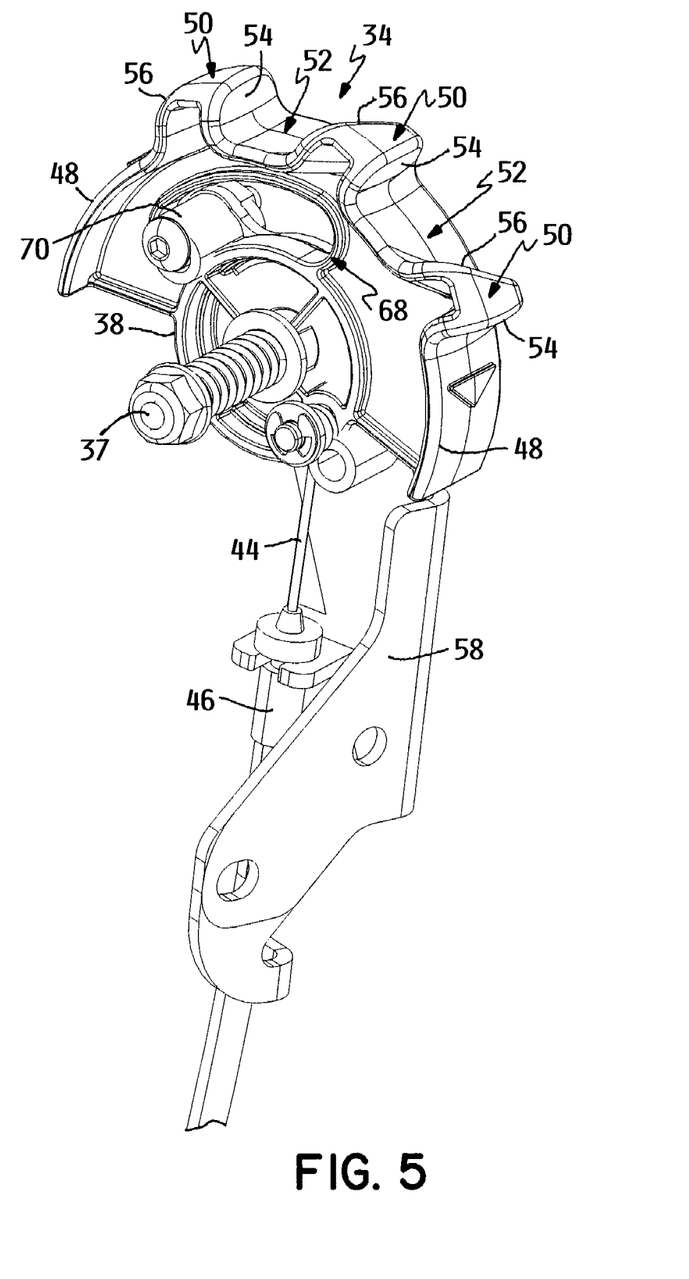
FIG. 5 is an enlarged rear perspective view of the throttle control shown in FIG. 3, particularly illustrating the only components of throttle control without showing the rest of the mower of FIG. 1.
Figure 6:
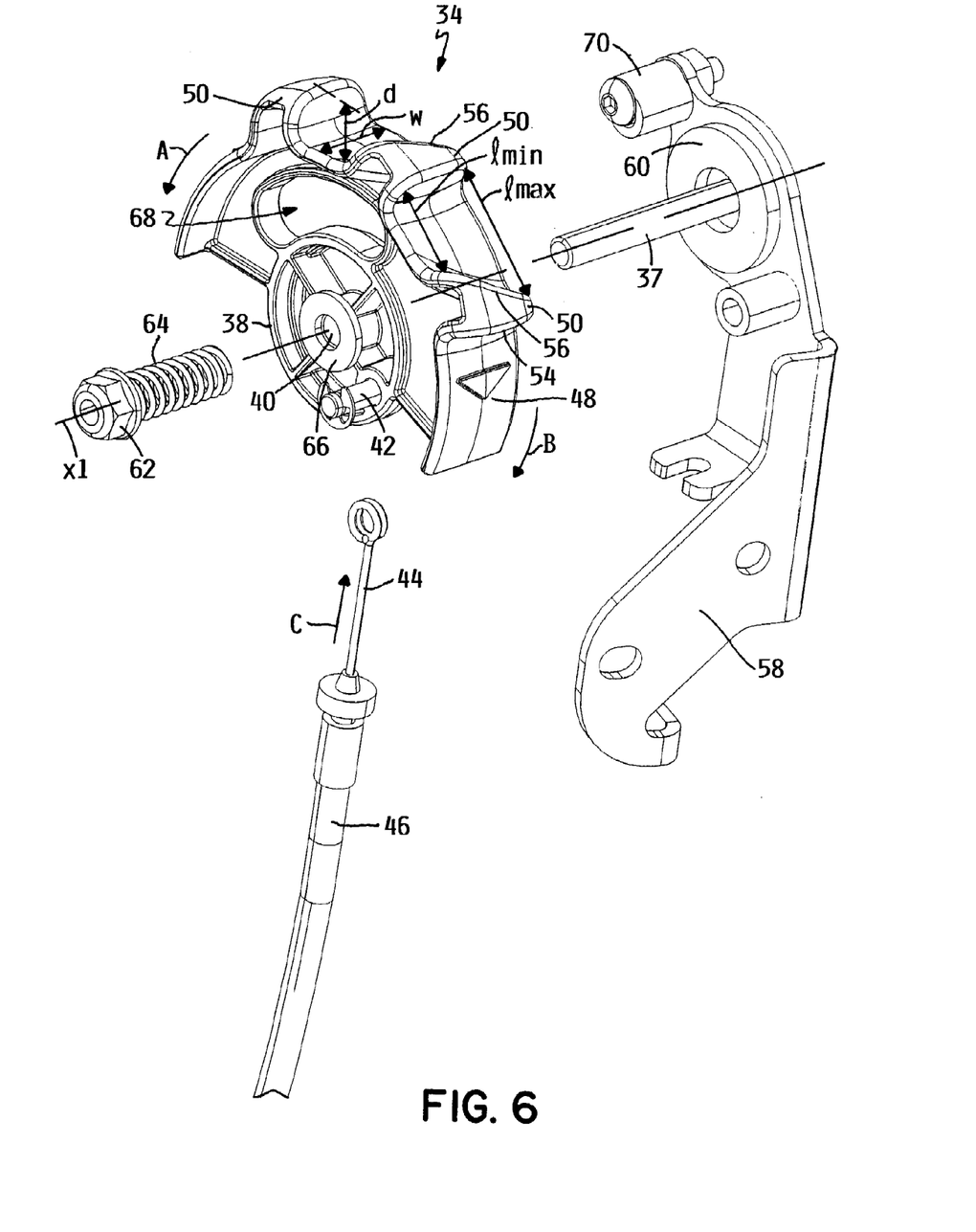
FIG. 6 is similar to FIG. 5 except that is in exploded form to better illustrate the components of the throttle control.

Referring now to FIGS. 5 and 6, thumb wheel 34 rotates about a substantially horizontal axis of rotation x1 which is defined by a substantially horizontal pivot 37. Thumb wheel 34 includes a circular hub 38 having a laterally extending bore 40 through which pivot 37 extends to rotatably journal thumb wheel 34 on pivot 37. Hub 38 includes a laterally protruding lug 42 which receives one end of the slidable inner wire 44 of a Bowden cable 46. The other end of inner wire 44 of Bowden cable 46 is attached to a throttle (not shown) on engine 10.

Thumb wheel 34 includes an arcuate rim 48 that is spaced radially outwardly from hub 38 and from axis of rotation x1 provided by pivot 37. Rim 48 preferably lies at a substantially constant radius from axis of rotation x1 in the manner of a circle. In addition, rim 48 preferably extends only around a portion of the circumference of a circle, i.e. about 180°.

Rim 48 of thumb wheel 34 has three outwardly extending, circumferentially spaced tabs 50 that define a pair of grooves 52 therebetween. Each groove 52 has a depth d that is deep enough (approximately 0.75 inches) and a length $l_{min}$ that at its narrowest is long enough (approximately 0.66 inches) to substantially receive therein either the operator's thumb or index finger when the thumb or index finger is placed on edge vertically and is inserted into groove 52. Each tab 50 has a rear face 54 that laterally extends in a substantially straight manner across the width w of groove 52 to allow the operator's thumb to comfortably engage rear face 54 of tab 50 to push on thumb wheel 34 forwardly in the direction of the arrow A. Each tab further has a front face 56 that laterally extends in an inclined manner across the width w of groove 52 to allow the operator's index finger to comfortably engage front face 56 of tab 50 to pull back on thumb wheel 34 rearwardly in the direction of the arrow B. As a measure of the degree of inclination of front face 56, the length $l_{max}$ of groove 52 at its widest (approximately 1.0 inches) substantially exceeds the length $l_{min}$ (approximately 0.66 inches) at its narrowest.

Pivot 37 is carried by a mounting bracket 58 that is itself fixed to traction frame 6 of mower 2. As best shown in FIG. 6, a friction disc 60 is also carried on bracket 58 surrounding pivot 37. One end of pivot 37 is threaded to receive a securing nut 62 after pivot 37 has been passed through the bore in hub 38 of thumb wheel 34 when the two are assembled together. A spring 64 bears against nut 62 and against a thrust surface 66 on hub 38 of thumb wheel 34 to force thumb wheel 34 laterally until the outer side of thumb wheel 34 engages firmly against friction disc 60. The friction between friction disc 60 and thumb wheel 34 will be sufficient to hold thumb wheel 34 in an adjusted position, but can be overcome by the operator through thumb or finger pressure on one of tabs 50 to rotate thumb wheel 34 from one position to another.

Thumb wheel 34 has an elongated arcuate slot 68 in the outermost side thereof. Slot 68 is located between hub 38 and rim 48 of thumb wheel 34. Slot 68 receives a pin 70 located on bracket 58 when bracket 58 and thumb wheel 34 are assembled together. When pin 70 engages the front side of slot 68 as shown in FIG. 5, thumb wheel 34 has been rotated rearwardly in the direction of arrow B as far as it will go. In this position, the throttle on engine 10 is in its minimum speed or idle position.

If the user wishes to advance the speed of engine 10 to increase the power output of engine 10, the user can simply drop his thumb down off hand grip 18 and place the thumb into one of grooves 52 on rim 48 of thumb wheel 34. The user can then use his or her thumb to push forwardly on rear face 54 of tab 50 at the front of groove 52 to rotate thumb wheel 34 forwardly in the direction of the arrow A. As this happens, the rotation of thumb wheel 34 will pull upwardly on inner wire 44 of Bowden cable 46 in the direction of the arrow C to advance the throttle on engine 10 to progressively increase the speed of engine 10 in concert with the rotational forward motion of thumb wheel 34. The operator can continue this advancing motion of thumb wheel 34 until the operator reaches the desired engine speed or until pin 70 on bracket 58 reaches the rear end of slot 68 in thumb wheel 34. This latter event stops thumb wheel 34 in its position of maximum advancement corresponding to full engine speed.

On the other hand, if the user wishes to retard the speed of engine 10 from any given speed that has already been established, the user can simply reach down with his or her index finger and put such finger on edge into one of grooves 52 on thumb wheel 34. The user can then engage the inclined front face on tab 50 at the back of groove 52 and pull back on thumb wheel 34 in the direction of arrow B. As this occurs, inner wire 44 of Bowden cable 46 will retract into the sheath of Bowden cable 46 due to spring force (not shown) applied to inner wire 44 of Bowden cable 46 at the throttle end of inner wire 44. This retraction of inner wire 44 of Bowden cable 46 will retard the throttle to slow engine 10 an amount related to how far thumb wheel 34 has been pulled back in the direction of the arrow B. If thumb wheel 34 is pulled back far enough so that pin 70 returns to the front end of slot 68 in thumb wheel 34 as shown in FIG. 5, the speed of engine 10 will return to its idle speed.

Figure 3:
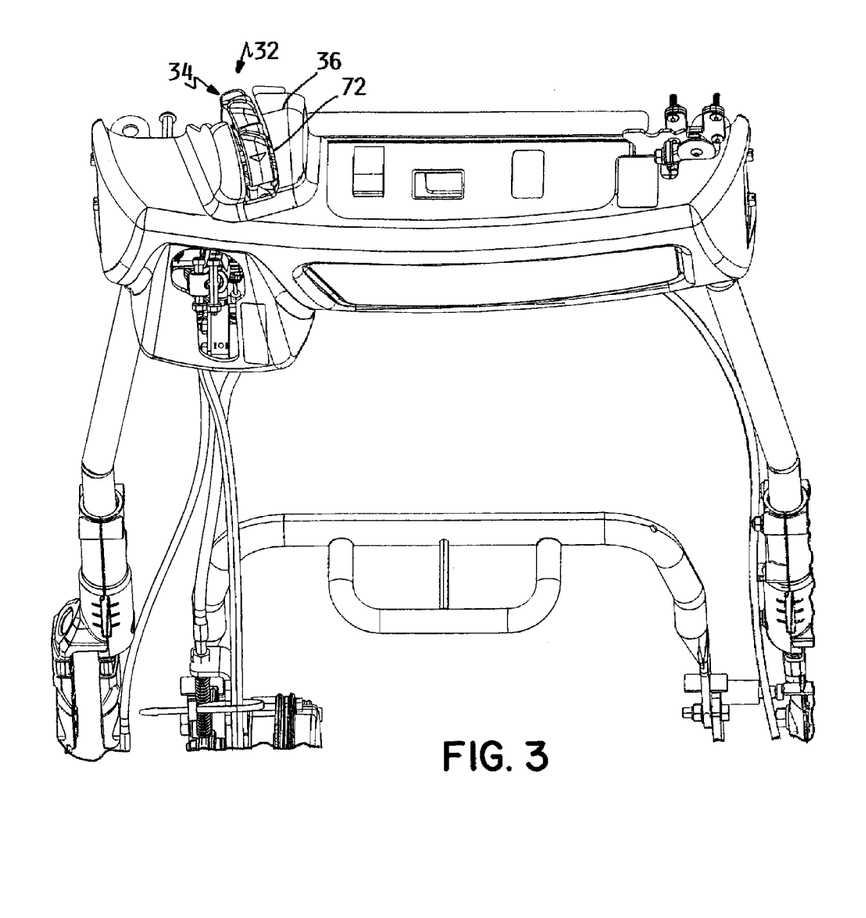
FIG. 3 is an enlarged top plan view of a portion of the mower of FIG. 1, particularly illustrating the thumb wheel throttle control of this invention and the inward inclination of the throttle control as it extends forwardly on the control panel of the handle assembly.
Figure 4:
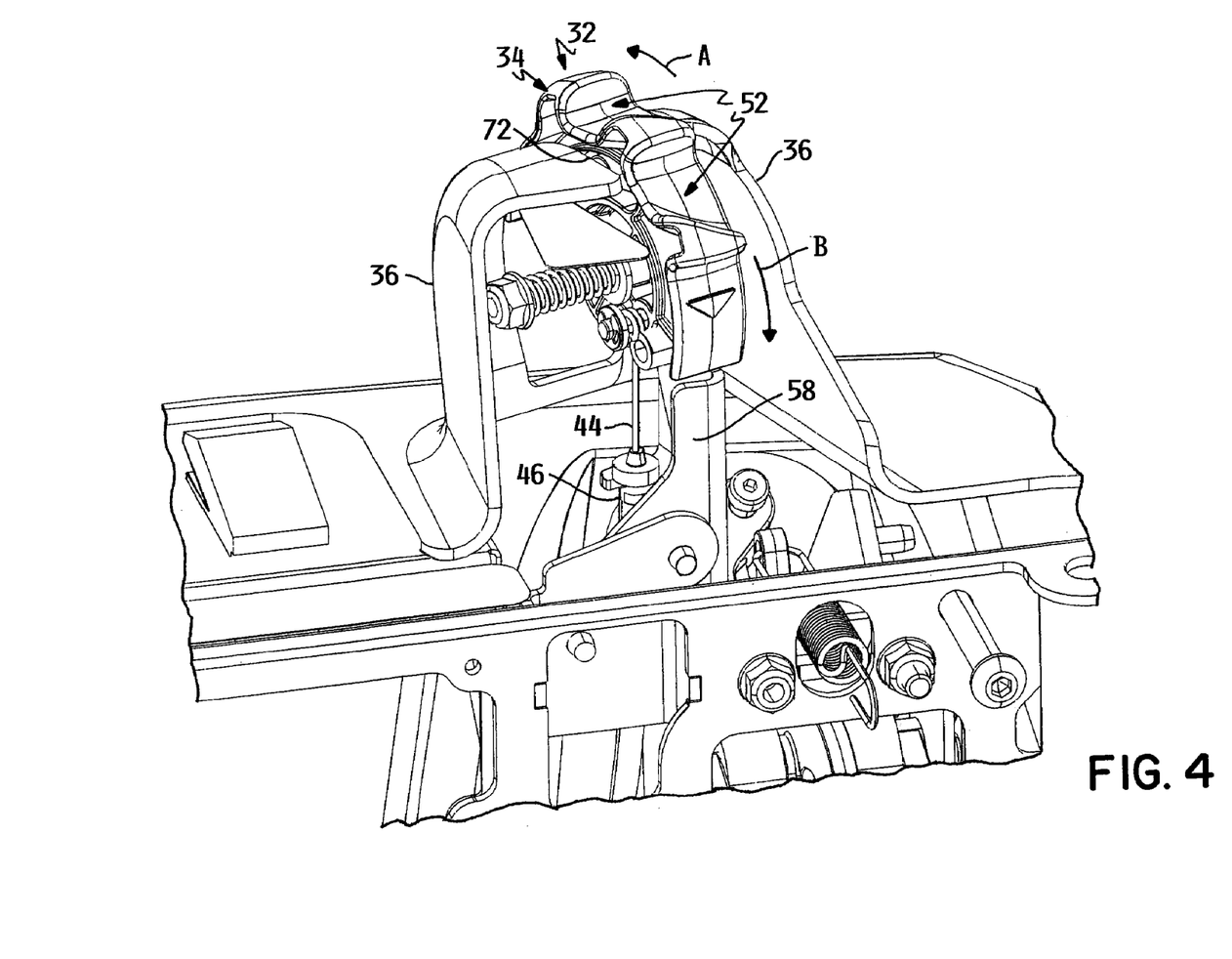
FIG. 4 is an enlarged rear perspective view of the throttle control shown in FIG. 3.

Referring to FIGS. 3 and 4, housing 36 that mounts thumb wheel 34 has a slot 72 through which the radially outermost portion of thumb wheel 34 protrudes so that the operator can access grooves 52 on rim 48 of thumb wheel 34 to rotate thumb wheel 34 selectively in the directions of the arrows A and B. Housing 36 and housing slot 72 cover only the front half or so of thumb wheel 34 with the rear portion of housing 36 being relatively open as shown in FIGS. 3 and 4. Thumb wheel 34 has a relatively large radius of approximately 3" measured from the axis of rotation x1 of thumb wheel 34 to rim 48 or of approximately 3.75" measured from the axis of rotation x1 of thumb wheel 34 to the radially outermost tops of tabs 50 that define grooves 52. This eases use of thumb wheel 34 and provides a thumb wheel 34 that is big enough to provide grooves of sufficient size to receive the operator's thumb or index finger. In addition, housing 36 and housing slot 72 are canted or inclined inwardly on the top of control panel 20 so that thumb wheel 34 inclines inwardly to the left of the user as it extends forwardly on control panel 20. This orientation allows the operator to more comfortably and ergonomically rotate thumb wheel 34 using the operator's thumb and index finger of his or her right hand.

Thumb wheel 34 is an effective and space efficient throttle control. Most people are familiar with the scroll wheel on a computer mouse and understand that rotating the scroll wheel in opposite directions up and down will advance the text on a computer display up and down. Clearly, operators will inherently understand how to use thumb wheel 34 as a throttle control from their experience with the scroll wheel on a computer mouse. Moreover, thumb wheel 34 is mounted and protected in housing 36 on control panel 20 with just rim 48 and tabs 50 projecting out through housing slot 72.

Since thumb wheel 34 is actuated by a simple rotation of thumb wheel 34, thumb wheel 34 does not experience the types of sideloads that might arise from the operator applying lateral force to a conventional lever type throttle control as the lever is moved fore-and-aft. This makes thumb wheel 34 more durable and less prone to being damaged. In addition, thumb wheel 34 can be easily actuated by either the thumb or index finger of the operator's right hand without having the operator completely remove his right hand from hand grip 18. For all these reasons, throttle control 32 comprising thumb wheel 34 disclosed herein is an advance in the mower art.

Figure 7:
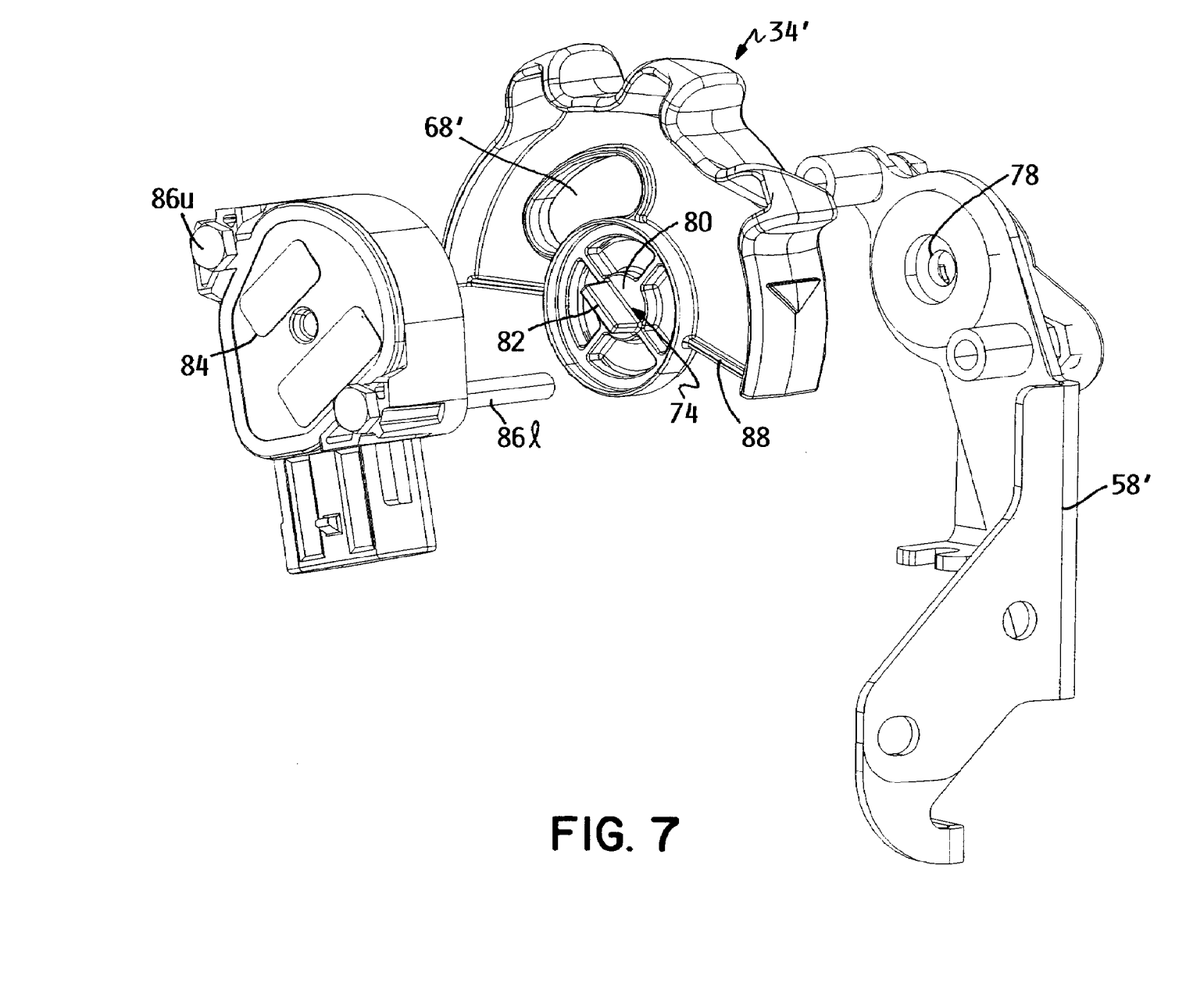
FIG. 7 is a view similar to FIG. 6, particularly showing in exploded form an alternative embodiment of the throttle control of this invention that is suited for use on a mower in which the power source comprises an electric motor rather than an internal combustion engine.
Figure 8:
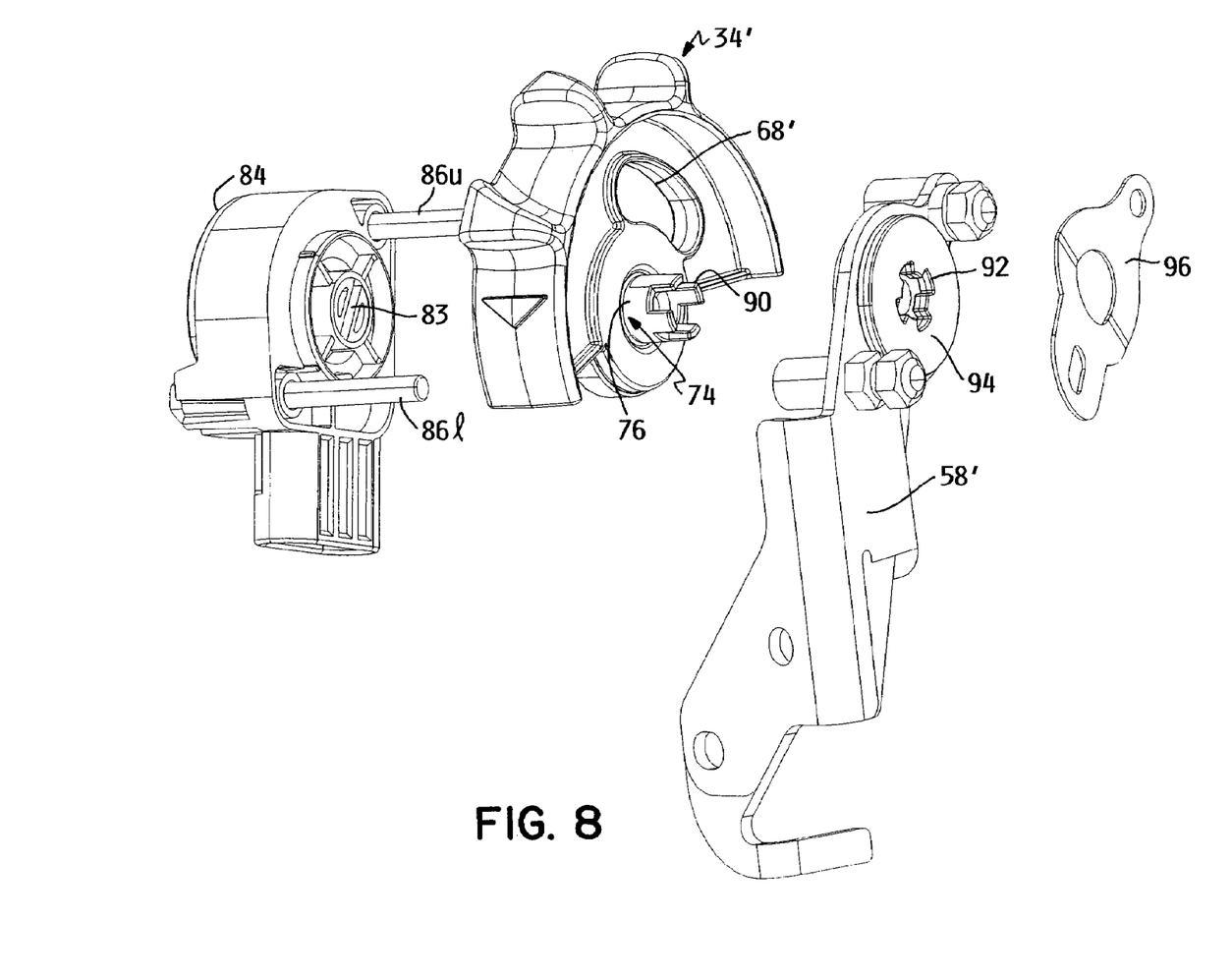
FIG. 8 is a view similar to FIG. 7 showing the throttle control of FIG. 7 from an opposite side.

Referring now to FIGS. 7 and 8, an alternative thumb wheel 34' is shown for use with a mower in which an electric motor is used in place of engine 10 as the power source of mower 2. In this embodiment, thumb wheel 34' is provided with a laterally extending pivot shaft 74 integrally formed thereon defining the axis of rotation x1. One side 76 of pivot shaft 74 projects laterally outwardly to one side of thumb wheel 34 to rotatably journal thumb wheel 34' in a bore 78 on bracket 58'. The other side 80 of pivot shaft 74 projects laterally outwardly from an opposite side of thumb wheel 34 and includes a key 82 that fits into a slot 83 on the rotary shaft of a rotary potentiometer 84.

Potentiometer 84 is bolted by upper and lower bolts 86*u* and 86*l* to bracket 58' to be fixed relative to bracket 58' while thumb wheel 34' is rotatable relative to bracket 58'. Upper bolt 86*u* used to secure potentiometer 84 to bracket 58' forms the pin that is received in the arcuate slot 68' in thumb wheel 34'. Lower bolt 86*l* passes beneath the lower edge 88 of the arcuate shape of thumb wheel 34' when thumb wheel 34' is at one extreme end of its range of motion corresponding to the idle speed position. Thus, lower bolt 86*l* will not interfere with the motion of thumb wheel 34' over the entire range of motion of thumb wheel 34'.

As thumb wheel 34' in this embodiment is rotated as described above, thumb wheel 34' correspondingly rotates the shaft of potentiometer 84. Potentiometer will serve as an input to a microprocessor based electronic controller (not shown) which will apply more or less electric current to the electric motor to progressively vary the rotational speed of the electric motor in concert with movement of thumb wheel 34'' in the same manner that movement of thumb wheel 34 varied the rotational speed of engine 10.

Referring to FIG. 8, the other side 80 of pivot shaft 74 of thumb wheel 34' is also keyed at 90 to fit into a matching keyway 92 in a stack of friction discs 94. A leaf spring 96 will normally engage against friction discs 94 to compress them against one side of bracket 58'. The frictional force developed by friction discs 94 against the side of bracket 58' will frictionally hold thumb wheel 34' in any adjusted position.

Various modifications of this invention will be apparent to those skilled in the art. Thus, the scope of this invention is to be limited only by the appended claims.

The invention claimed is:

1. A mower for cutting grass, which comprises:
   (a) a traction frame supported for movement over the ground;
   (b) a power source carried on the traction frame, the power source having a variable power output;
   (c) a grass cutting unit carried on the traction frame;
   (d) a hand operated rotary wheel operatively carried on the traction frame for rotation about an axis in first and second opposite directions, wherein rotation of the wheel operatively increases and decreases the power output of the power source as the wheel is rotated in the first and second directions, respectively, wherein the wheel rotates about a substantially horizontal pivot axis, and wherein the wheel is located below a hand grip carried on the traction frame such that the wheel can be accessed by a thumb or index finger of one hand of an operator without requiring the operator to remove the one hand from the hand grip; and
   (e) wherein the wheel is carried on an upwardly and rearwardly extending handle assembly that is attached to the traction frame, wherein the handle assembly comprises two laterally spaced, upwardly and rearwardly extending handle tubes whose upper ends are joined together by the hand grip with the hand grip being long enough to allow the operator to grip the hand grip with both hands, wherein the handle tubes have a control panel extending therebetween, wherein the control panel includes an upwardly facing top surface located below the hand grip with the top surface of the control panel having an upwardly projecting housing along one side thereof for rotatably journaling the wheel.

2. The mower of claim 1, wherein the wheel comprises an arcuate rim having a plurality of radially outwardly extending tabs that are spaced apart along the rim to define a plurality of grooves between the tabs, wherein the grooves are deep enough and long enough to allow an operator to place his or her thumb or index finger into the groove in a manner that permits the operator to push forwardly on a rear face of a tab at the front of the groove to rotate the wheel in the first direction and to pull rearwardly on a front face of an adjacent tab at the rear of the groove to rotate the wheel in the second direction.

3. The mower of claim 2, wherein the front face of each tab extends substantially laterally straight across a width of the groove and the rear face of each tab is inclined laterally as it extends across the width of the groove.

4. The mower of claim 2, wherein there are at least three tabs and two grooves along the rim.

5. The mower of claim 1, wherein the wheel is inclined inwardly relative to a straight fore-and-aft direction as the wheel extends forwardly on the handle assembly.

6. The mower of claim 1, wherein the wheel is on a right side of the handle assembly and is inclined to the left relative to a user who is standing behind the handle assembly.

7. The mower of claim 1, wherein the wheel comprises an arcuate rim that extends around only a portion of a 360° periphery.

\* \* \* \* \*